UNITED STATES PATENT OFFICE.

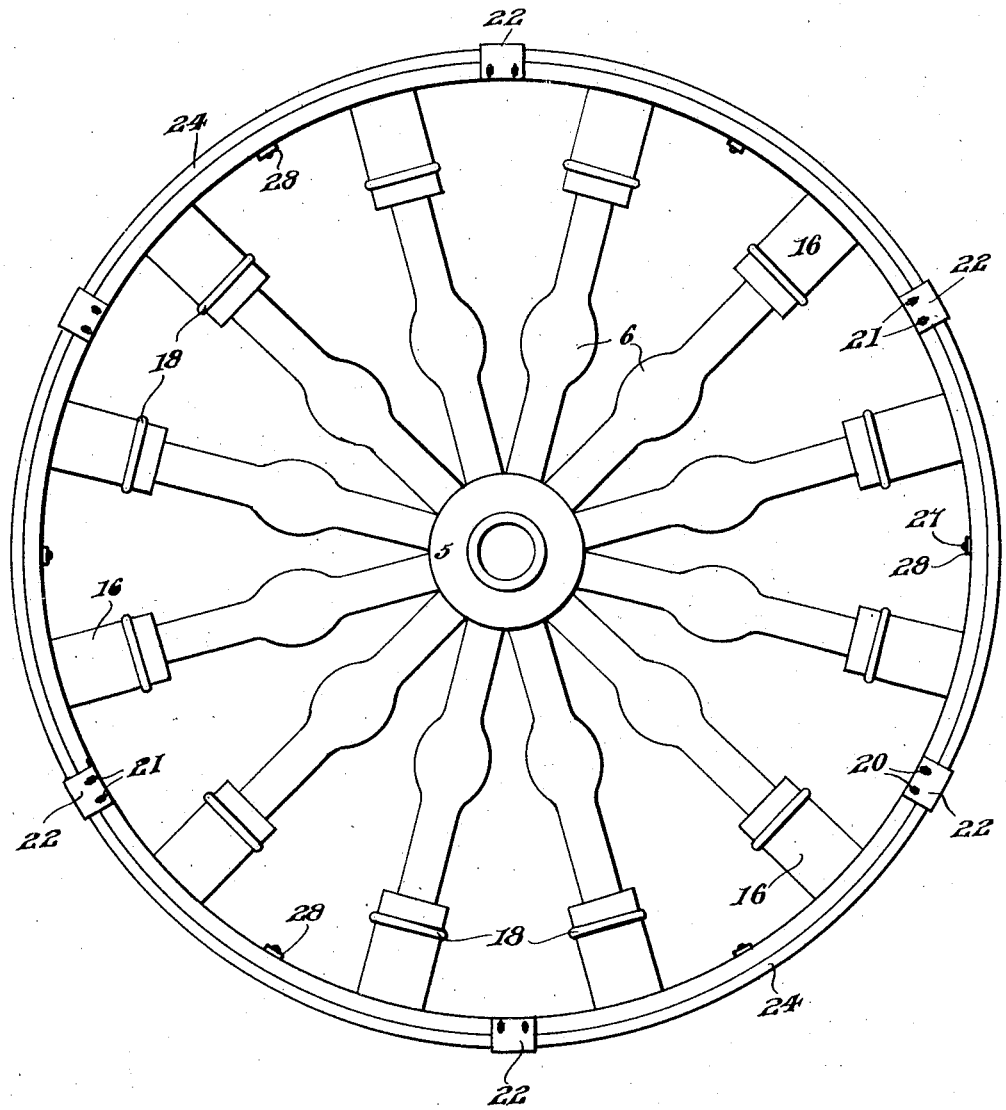

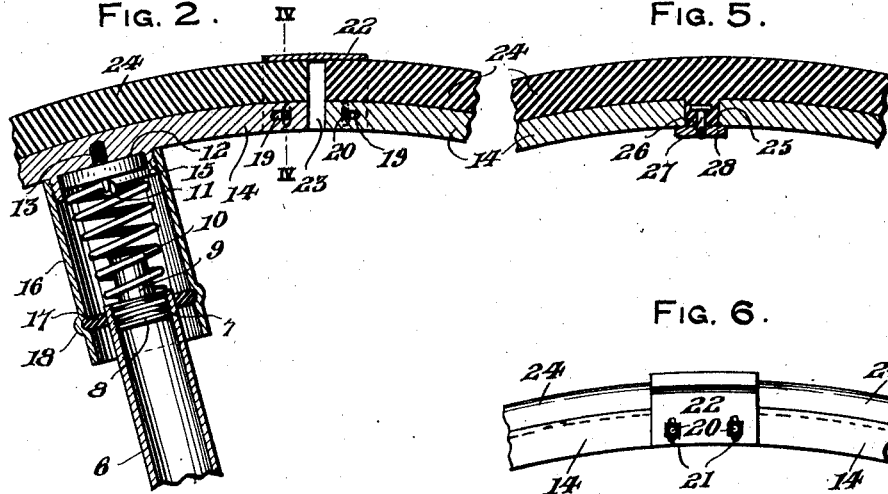
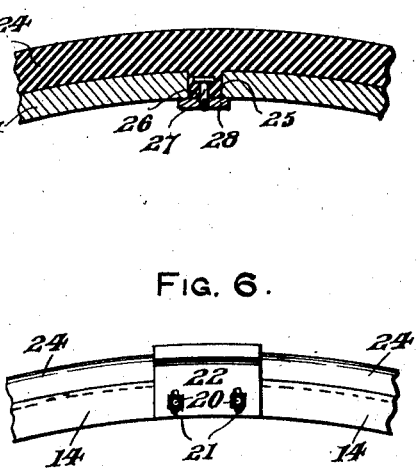
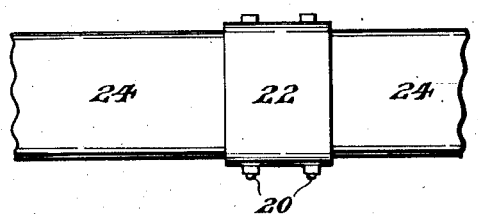
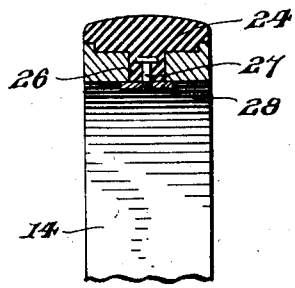
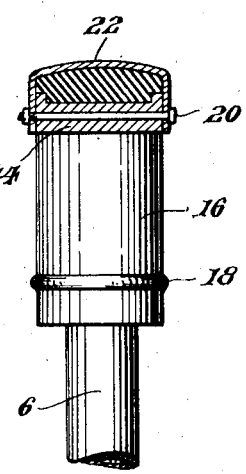

TONY N. PETROVIC, OF PICTOU, COLORADO.

SPRING-WHEEL.

1,339,132.　　　　　Specification of Letters Patent.　　Patented May 4, 1920.

Application filed September 15, 1919. Serial No. 323,710.

*To all whom it may concern:*

Be it known that I, TONY N. PETROVIC, a citizen of Jugo-Slavia, residing at Pictou, in the county of Huerfano and State of Colorado, have invented certain new and useful Improvements in Spring-Wheels, of which the following is a specification.

This invention relates to certain new and useful improvements in spring wheels and is especially designed for use upon automobiles and other road vehicles.

The primary object of the present invention is to provide a spring wheel constructed to provide sufficient resiliency for all practical purposes without the necessity of employing pneumatic tires.

A further object of the invention is to provide a spring wheel of such simple construction as to be capable of being cheaply and easily manufactured as well as being durable and efficient in operation.

With the above general objects in view and others that will become apparent as the nature of the invention is better understood, the same consists in the novel form, combination and arrangement of parts hereinafter more fully described, shown in the accompanying drawings and claimed.

In the drawings, forming part of this specification wherein like reference characters indicate similar parts throughout the several views, Figure 1 is a side elevational view of a spring wheel constructed in accordance with the present invention, Fig. 2 is a sectional fragmentary detail view taken through a portion of one of the spokes, felly, and the tire of the wheel shown in Fig. 1, Fig. 3 is a top plan view of the device shown in Fig. 2, Fig. 4 is a radial sectional view taken substantially upon line IV—IV of Fig. 2, Fig. 5 is a sectional fragmentary view illustrating the means for fastening the tire to the felly, Fig. 6 is a side elevational view of the device shown in Fig. 3, and Fig. 7 is a transverse sectional view of the device shown in Fig. 5.

Referring more in detail to the several views, the present wheel embodies a hub 5 of any desired construction having a plurality of tubular spokes 6 extending radially therefrom, said spokes being internally threaded at their outer ends as at 7 in Fig. 2 for detachable reception of the threaded plugs 8 which have outwardly directed posts 9 rigid therewith. The posts 9 are encircled by the inner ends of the compression springs 10 which rest upon the plugs 8 and have their outer ends fastened as at 11 to the heads of the stud screws 12 which are threaded into sockets 13 provided in the felly sections 14. The felly sections 14 are provided with inwardly directed externally threaded tubular bosses 15 which surround the heads of the stud screws 12 and which have the outer ends of the sleeves 16 threaded thereon, said sleeves 16 extending radially inwardly and surrounding in spaced relation at their inner ends the outer ends of the tubular spokes 6. In order to yieldingly retain the spokes 6 concentric within the sleeves 16, packing washers 17 of rubber or other resilient material are disposed within the beads 18 of the sleeves 16 and have their inner faces in contact with the outer faces of the adjacent outer ends of the spokes 6.

The felly sections 14 are provided at their adjacent ends with circumferentially elongated transverse slots 19 through which pass the bolts 20 which also pass through radially elongated slots 21 provided in the side flanges of the substantially U-shaped metallic straps 22 which span the spaces 23 between the felly sections 14 and the spaces between the tire sections 24 which are fastened upon the felly sections 14 in a manner to be described. The U-shaped straps 22 have their flanges in contact with the sides of the felly sections 14 and the tire sections 24 while the portions of the straps 22 which connect the flanges thereof are disposed upon the outer faces of the adjacent ends of the tire sections 24.

As shown more clearly in Figs. 5 and 7, the felly sections 14 are radially apertured as at 25 and lugs 26 formed upon the tire sections 24 project inwardly through these apertures. As the tire sections 24 are formed of resilient material such as rubber, the bolts 27 are embedded within the lugs 26 with their inner threaded ends projecting inwardly beyond the inner faces of the felly sections 14. Nuts 28 are threaded upon the ends of the bolts 27 and as said nuts are of larger dimensions than the apertures 25, said nuts cannot pass outwardly through the latter and therefore retain the tire sections in position upon the felly sections 14.

In operation, the straps 22 are allowed to move inwardly in a radial direction for compression of the ends of the tire sections 24 by reason of the provision of the elongated slots 21. When a section 14 of the felly is compressed radially inwardly, a spring 10 is placed under compression and the adjacent pair of sleeves 16 slide inwardly relative to the spokes 6. This inward movement is allowed by reason of the slots 19 and the spaces 23 normally existing between the adjacent ends of the felly sections 23. As the sections 14 are allowed circumferential displacement relative to the spokes 6 by means of the washer 17, it is not necessary to provide the pin and slot connections 19 and 20 between every pair of spokes.

From the foregoing description it is believed that the construction and operation of the present invention will be readily understood by those skilled in the art.

While the form of the invention herein shown and described is what is believed to be the preferable embodiment thereof, it is nevertheless to be understood that minor changes may be made in the form, combination and arrangement of parts without departing from the spirit and scope of the invention as claimed.

What I claim as new is:

1. A spring wheel comprising in combination with a hub having radial tubular spokes connected thereto, plugs removably fastened in the outer ends of said spokes and having compression springs resting upon said plugs and encircling said posts at their inner ends, a plurality of connected felly sections having free circumferential movement toward and away from each other and provided with inwardly directed bosses, the outer ends of said springs being detachably fastened to the felly sections centrally of said bosses, inwardly extending sleeves detachably secured to said bosses and surrounding in spaced relation the outer ends of said spokes, and yieldable washers interposed between the outer ends of said spokes and the inner ends of said sleeves.

2. A spring wheel comprising in combination with a hub having radial tubular spokes connected thereto, plugs removably fastened in the outer ends of said spokes and having compression springs resting upon said plugs and encircling said posts at their inner ends, a plurality of connected felly sections having free circumferential movement toward and away from each other and provided with inwardly directed bosses, the outer ends of said springs being detachably fastened to the felly sections centrally of said bosses, and inwardly extending sleeves detachably secured to said bosses and surrounding in spaced relation the outer ends of said spokes.

3. A spring wheel comprising in combination with a hub having radial tubular spokes connected thereto, plugs removably fastened in the outer ends of said spokes and having compression springs resting upon said plugs and encircling said posts at their inner ends, a plurality of connected felly sections having free circumferential movement toward and away from each other and provided with inwardly directed bosses, the outer ends of said springs being detachably fastened to the felly sections centrally of said bosses, inwardly extending sleeves detachably secured to said bosses and surrounding in spaced relation the outer ends of said spokes, yieldable washers interposed between the outer ends of said spokes and the inner ends of said sleeves, said felly sections having apertures therethrough, cushion tire sections mounted on said felly sections and provided with inwardly directed lugs having bolts embedded therein, said bolts having their threaded ends projected inwardly beyond the inner faces of the felly sections, and nuts of larger dimensions than the apertures of the felly sections threaded upon the ends of said bolts.

In testimony whereof I affix my signature.

TONY N. PETROVIC.